United States Patent
Ophey et al.

(10) Patent No.: US 11,688,844 B2
(45) Date of Patent: Jun. 27, 2023

(54) PROCESS FOR THE SOLVENT-FREE COATING OF FOILS FOR ELECTROCHEMICAL APPLICATIONS

(71) Applicant: Fraunhofer-Gesellschaft zur Foerderung der angewandten Forschung e.V., Munich (DE)

(72) Inventors: Jannes Marten Ophey, Itzehoe (DE); Andreas Würsig, Itzehoe (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 56 days.

(21) Appl. No.: 17/326,377

(22) Filed: May 21, 2021

(65) Prior Publication Data

US 2021/0367223 A1  Nov. 25, 2021

(30) Foreign Application Priority Data

May 25, 2020  (DE) .......................... 102020113926.8

(51) Int. Cl.

| | | |
|---|---|---|
| *H01M 4/04* | (2006.01) | |
| *H01M 50/426* | (2021.01) | |
| *H01M 50/443* | (2021.01) | |
| *B05C 11/02* | (2006.01) | |
| *B05D 7/14* | (2006.01) | |
| *B30B 11/00* | (2006.01) | |
| *B30B 11/34* | (2006.01) | |
| *B30B 15/30* | (2006.01) | |
| *C08K 3/04* | (2006.01) | |
| *H01M 4/36* | (2006.01) | |
| *H01M 4/60* | (2006.01) | |
| *B05C 11/04* | (2006.01) | |

(52) U.S. Cl.
CPC ......... *H01M 4/0435* (2013.01); *B05C 11/025* (2013.01); *B05D 7/14* (2013.01); *B30B 11/007* (2013.01); *B30B 11/34* (2013.01); *B30B 15/308* (2013.01); *C08K 3/04* (2013.01); *H01M 4/0402* (2013.01); *H01M 4/366* (2013.01); *H01M 4/602* (2013.01); *H01M 50/426* (2021.01); *H01M 50/443* (2021.01); *B05C 11/048* (2013.01); *B05D 2401/32* (2013.01); *B05D 2506/15* (2013.01); *B05D 2518/10* (2013.01); *C08K 2201/001* (2013.01)

(58) Field of Classification Search
CPC .... B65G 17/00; B05D 2252/04; B05C 19/04; B05B 7/144; H01M 4/0435; H01M 4/0402
See application file for complete search history.

(56) References Cited

U.S. PATENT DOCUMENTS

| | | | |
|---|---|---|---|
| 6,022,436 A | 2/2000 | Koslow et al. | |
| 7,147,744 B2 | 12/2006 | Kaz et al. | |
| 8,715,780 B2 | 5/2014 | Bruderer et al. | |
| 10,062,920 B2 | 8/2018 | Umeda et al. | |
| 2002/0150812 A1 | 10/2002 | Kaz et al. | |
| 2005/0250011 A1* | 11/2005 | Mitchell | H01M 4/1391 429/217 |
| 2011/0293823 A1* | 12/2011 | Bruderer | B05D 1/30 427/195 |
| 2012/0040243 A1* | 2/2012 | Zhong | H01G 11/68 429/211 |
| 2016/0056493 A1* | 2/2016 | Umeda | B05B 5/084 222/189.03 |
| 2016/0181651 A1* | 6/2016 | Tanihara | H01M 4/0435 118/103 |

FOREIGN PATENT DOCUMENTS

WO    2009/050724    * 4/2009

\* cited by examiner

*Primary Examiner* — Tabassom Tadayyon Eslami
(74) *Attorney, Agent, or Firm* — Duane Morris LLP

(57) ABSTRACT

The present invention provides a solvent-free process for producing foil with a functional coating containing an active material and a meltable polymer, the foil with a functional coating and its use as an electrode foil, electrolyte in solid-state batteries or separator for electrochemical storage. The process comprises scattering a dry powder mixture onto a foil, melting the dry powder mixture, and calendering the foil covered with the molten powder.

12 Claims, No Drawings

US 11,688,844 B2

PROCESS FOR THE SOLVENT-FREE COATING OF FOILS FOR ELECTROCHEMICAL APPLICATIONS

FIELD OF THE INVENTION

The present invention relates to a process for the solvent-free production of a coated foil for use as an electrode foil, electrolyte in solid-state batteries or separator for accumulators or other electrochemical storage devices, a foil producible by this process and applications of this foil.

STATE OF THE ART

The production of lithium-ion batteries consists of many different process steps, the optimization of which can save costs. One process step in manufacturing is the production of the electrode foils. For this purpose, the active materials are first dispersed together with various conductivity additives in a binder solution. Water or N-methyl-2-pyrrolidone (NMP) is used as the solvent. In a further step, the resulting paste-like mass is then applied to a metal foil via a coating head in a coating system and then dried. The disadvantage of this process is that the drying process step is energy-intensive and long drying lines are required. In addition, the solvent used, NMP, is considered hazardous to health and reproduction and therefore a substance of very high concern. In addition, the use of NMP as a solvent in electrode coating will be ruled out in the future due to legal requirements.

Various processes are known for the solvent-free production of electrode foils. In calender-based processes, powdered functional material mixtures are introduced into a roll nip and a foil is produced which is pressed onto the current collector in a further process step, or a current collector is additionally introduced directly into the roll nip so that a finished electrode leaves the calender. Another possibility is based on powder spray processes and an electrostatically assisted powder application, in which the material mixture is transferred to the current collector in a high-voltage induced electrical field.

Now U.S. Pat. No. 9,960,409, describes a screen application in which a granulate containing active material and binder is screened onto a current collector and then compacted via a roller system.

WO 2014/155168 A1 describes a process for the production of a coated electrode foil, in which granules containing active material and binder are scattered on a foil and then calendered.

Problems to be Solved by the Invention

However, the processes known in the prior art are laborious and slow and usually require special equipment to achieve a uniform coating.

Therefore, it is the object of the present invention to provide a process by which a solvent-free and uniform coating of foils can be carried out in a simple and efficient manner.

SUMMARY OF THE INVENTION

The object was accomplished by providing a process comprising a simple application of solvent-free starting materials, melting of the starting materials and calendering.

More particularly, the subject matter of the present invention is described in the following points:

[1] A process of producing a foil with a functional coating containing an active material and a meltable polymer, wherein the foil having a functional coating is for use as an electrode foil, electrolyte in solid-state batteries, or separator for electrochemical storage, the process comprising the steps of:

(a) providing a dry powder mixture comprising (i) particles of an active material and (ii) particles of a meltable polymer, (b) scattering the dry powder mixture on a foil to form a powder-covered foil, (c) melting the powder of the powder-covered foil to form a foil covered with molten powder, (d) calendering the foil covered with molten powder to form a calendered structure; and (e) cooling the calendered structure to form the foil with a functional coating.

[1-1] Preferably, the particles (i) and/or (ii) in the dry powder mixture provided in step (a) of point [1] are at least partly present as separate particles.

[2] The process according to point [1] or [1-1], wherein step (c) is carried out before step (d).

[3] The process according to point [1] or [1-1], wherein steps (c) and (d) are carried out simultaneously by hot calendering.

[4] The process according to any one of the preceding points [1], [1-1], [2] or [3], wherein the volume average particle size $D_{50}$ of the particles (i) is more than 5.0 µm and the volume average particle size $D_{50}$ of the particles (ii) is 5.0 µm or less in the dry powder mixture.

Preferred embodiments in the process according to point [4] are those according to the following point: [4-1] the size of the particles (i) is at least twice the size of the particles (ii); [4-2] the particles (i) have a size greater than 20 µm.

[5] The process according to any one of the preceding points, wherein steps (b) to (e) are carried out continuously.

[6] The process according to any one of the preceding points, wherein the dry powder mixture further comprises conductivity additive particles.

[7] The process according to any one of the preceding points, wherein the dry powder mixture does not adhere to the foil after being sprinkled onto the foil in step (b) and before melting in step (c) and rests on the foil only by the action of gravity. Here, the plane of the foil has to be essentially perpendicular to the direction of gravity.

[7-1] The combination of the features of points [1], [1-1] and [7] is preferred. [7-2] A combination of the features of points [2] and [7], i.e. concretely [1], [2] and [7] or [1-1], [2] and [7], may also be preferred.

[8] The process according to any one of the preceding points, wherein scattering the dry powder mixture on the foil in step (b) is the only process step for distributing the powder on the foil until melting in step (c).

[8-1] The combination of the features of points [7] and [8] is preferred. [8-2] The combination of the features of points [7-1] or [7-2] and [8] is more preferred.

[9] The process according to any one of the preceding points, wherein step (b) is carried out by applying the dry powder mixture to a scattering roller, scraping the dry powder mixture off the scattering roller by means of an oscillating brush, and dropping the dry powder mixture onto the foil through at least one oscillating distribution disc.

Preferred are the embodiments according to the following points: [9-1] the combination of the features of items [9] and [7] or [7-1] or [7-2]; [9-2] the combination of the features of points [9] and [8-1] or [8-2]; [9-3] the combination of the features of points [9] and [4-1]; [9-4] the combination of the features of points [9-2] and [9-3]; [9-5] the combination of the features of points [9], [8-2] and [4-1].

[10] The process according to any one of the preceding points, which is a process for producing a metal foil with a functional coating for use as an electrode foil.

[11] The process according to any one of the preceding points, wherein the active material is at least one material selected from the group consisting of metal oxides, activated carbon, graphite, metal phosphates, and silicon compounds, and/or the meltable polymer is at least one polymer selected from the group consisting of polyvinylidene fluoride, polytetrafluoroethylene, and polysiloxanes.

[12] The process according to point [1] or [1-1], wherein steps (b) to (e) are carried out continuously and step (c) is carried out before step (d).

Preferred are the embodiments according to the following points: [12-1] the combination of the features of points [12] and [8-1] or [8-2]; [12-2] the combination of the features of points [12] and [9-1]; [12-3] the combination of the features of points [12] and [9-2]; [12-4] the combination of the features of points [12] and [9-3]; [12-5] the combination of the features of points [12] and [9-4] or [9-5].

[13] The process according to point [1] or [1-1], wherein steps (b) to (e) are carried out continuously, the scattering of the dry powder mixture on the foil in step (b) is the only process step for distributing the powder on the foil until melting in step (c), and steps (c) and (d) are carried out simultaneously by hot calendering.

Preferred are the embodiments according to the following points: [13-1] the combination of the features of points [13] and [8-1]; [13-2] the combination of the features of points [13] and [9-1]; [13-3] the combination of the features of points [13] and [9-2]; [13-4] the combination of the features of points [13] and [9-3]; [13-5] the combination of the features of points [13] and [9-4].

[14] A foil with a coating comprising an active material and a polymer, obtainable by a process according to any one of points [1] to [13] and [1-1] to [13-5].

[15] The use of the foil with a coating according to point [14] as electrode foil or separator for electrochemical storage.

Advantages of the Invention

Compared to solvent-based processes, the process according to the invention has the advantage that material costs are reduced by omitting the solvent during coating and drying is no longer required, thus reducing costs. By eliminating the solvent NMP, the otherwise mandatory NMP recovery is not required and the environment is relieved.

Compared to other solvent-free processes, the process according to the invention enables an easy-to-produce uniform coating of foils. In cold calendering, the melting of the binder before calendering enables a higher speed of the continuously performed process. In hot calendering, the step of prior melting can be omitted.

The process according to the invention can be used for the solvent-free coating of electrode foils for accumulators or capacitors, of separators for accumulators or capacitors, of electrodes for solid-state batteries, of solid-state electrolytes for solid-state batteries or of hybrid electrolytes for solid-state batteries.

EMBODIMENTS OF THE INVENTION

The process according to the invention is used to produce the foil with a functional coating according to the invention.

The foil can be a current collector, for example a metal foil, and can be used as an electrode foil. The foil can also be a porous foil, for example a plastic foil, and can be used as a separator for accumulators or capacitors. The foil can also be an already finished electrode foil to which a further functional coating is applied.

The functional coating contains active material, a meltable polymer and, if necessary, a conductivity additive. The starting material of the functional coating is a dry powder mixture in which the components of the functional coating are contained in particle form. Herein, the particles of active material may simply be referred to as particles (i), and the particles of meltable polymer may simply be referred to as particles (ii). Herein, the particles of any type used to prepare the dry powder mixture, for example, particles (i) and particles (ii), are also referred to by the generic term as starting material particles.

Preferred active materials for a positive electrode are oxides of lithium and transition metals, such as lithium nickel oxides, lithium cobalt oxides, lithium manganese oxides and compounds of these oxides, phosphates of lithium and transition metals, such as lithium manganese phosphate and lithium iron phosphate, and lithium manganese iron phosphates. Preferred active materials for a negative electrode are carbonaceous materials, such as artificial or natural graphite, amorphous carbon, lithium transition metal oxides, and silicon compounds.

Examples of the fusible polymer include PVDF (polyvinylidene fluoride), PTFE (polytetrafluoroethylene) and polysiloxanes.

Examples of conductivity additives include carbon black, porous carbon, carbon nanotubes, graphene, graphite, and carbon fibers.

The process according to the invention can be used to carry out a solvent-free coating of electrode foils for accumulators or capacitors, of separators for accumulators or capacitors, of electrodes for solid-state batteries, of solid-state electrolytes for solid-state batteries or of hybrid electrolytes for solid-state batteries. The foil with a coating according to the invention can be used for these applications.

The steps of the process according to the invention are described below.

Step (a)

A dry powder mixture is provided which contains at least particles (i) and particles (ii). In addition, conductivity additives may be included.

The dry powder mixture is dry and preferably contains less than 5 wt %, more preferably less than 3 wt % of water. The dry powder mixture is solvent-free and thus also contains no organic solvent such as NMP.

Dry powder blending can be done by intensive mixing or blending of the components, e.g. in a mill, such as a ball mill or mortar grinder, or a planetary mixer. The preparation of the dry powder mixture is carried out in a solvent-free manner.

A dry powder mixture can be produced as a dry blend mixture without using solvents. For this purpose, the components used in the mixing process are vacuum-dried under the influence of temperature to drive out residual water. This is done in a desiccator or a vacuum dryer. The materials can be mixed initially by diffusive mixing, e.g. by means of a drum mixer, then by means of a propeller mill. In the case of the binder powder, its average particle size should preferably not be greater than 5 µm, since otherwise too high a proportion of binder must be used in order to subsequently obtain sufficient adhesion when applied to the foil. Agglomerates can be broken up with a propeller mixer so that the particles can be refined.

The particles of the dry powder mixture may be present as separate particles, so that, for example, the starting material particles are separate and do not adhere to each other by physical or chemical interactions. However, particles of the dry powder mixture can also adhere to each other and thus form larger units. For example, intensive dry mixing, possibly with heating, can produce granules containing starting material particles of different types, e.g. particles (i) and particles (ii). The particle sizes in the granules are preferably unchanged compared to the sizes of the starting material particles. To ensure uniform application, the granules are preferably small and contain only a few starting material particles. For example, a granule particle may be a particle (i) covered with particles (ii). Preferably, the particles (i) and/or (ii) of the dry powder mixture provided in step (a) are at least partly, i.e. at a ratio of at least 30 wt % or at least 50 wt % based on the total amount of provided particles (i) and (ii), present as separate particles.

The starting material particles of different types preferably have different sizes. The particle size of particles (i) is preferably 5 μm to 200 μm, more preferably 10 μm to 100 μm. The particle size of particles (ii) is preferably less than 10 μm, more preferably 5 μm or less. In a dry powder mixture used according to the invention, particles (i) are preferably larger than particles (ii), more preferably at least twice as large, even more preferably at least five times as large as particles (ii). A combination of particles (i) of a size greater than 5.0 μm and particles (ii) of a size of 5.0 μm or less is preferred, more preferably the particles (i) are at least twice as large as the particles (ii). Even more preferred is a combination of particles (i) of a size greater than 20 μm and particles (ii) of a size of 5.0 μm or less. The particle sizes indicated herein are $D_{50}$ values by volume.

A typical dry powder mixture contains 80-99 parts by mass of particles (i) and 1-20 parts by mass of particles (ii) in 100 parts by mass of the sum of particles (i) and particles (ii).

In the dry powder mixture, the smaller particles (ii) can fill the interstices of the larger particles (i). In the case of the dry powder mixture partly consisting of separate particles (i) and (ii) and partly consisting of granules of the particles (i) and (ii), the separate particles, particularly the very small particles (ii), can fill the interstices. As a result, after melting and subsequent cooling of the particles (ii) or the granules, respectively, a polymer network can be formed that serves as a binder and, in the presence of embedded conductivity additives, is also suitable for conducting electricity.

Step (b)

The dry powder mixture prepared in step (a) is scattered on a foil. This means that the application of the dry powder mixture to the foil is carried out exclusively under the action of gravity. Other forces are excluded during the application.

The dry powder mixture is preferably applied via a metering hopper to a scattering roller, which is provided with a specially structured coating. An oscillating brush sweeps the powder out of the scattering roller. In order to ensure uniformity of the powder application and to break up any lumps, the powder falls without contact through at least one oscillating distributor sieve onto the passing foil, depending on the flowability. The powder application rate can be precisely adjusted by the speed of rotation of the scattering roller, the oscillation speed of the brush, and the passing speed of the foil. Depending on the active material used, an adjustment of the powder scattering unit used (among other things, different scattering roller, brush-out bar, bridge breaker) is necessary due to the different particle size and morphology.

In the process using a scattering roller and a brush, preferably only low shear forces act on the powder particles. This has the advantage that the particles are not crushed into non-uniform fragments. Such fragments would have a lower flowability and would thus lead to an uneven application to the foil.

In a preferred embodiment, the dry powder mixture does not adhere to the foil after being scattered onto the foil in step (b) until it melts in step (c) and rests on the foil exclusively by the action of gravity. Thus, between step (b) and step (c), preferably no actions are taken that lead to a physical or chemical interaction between the dry powder mixture and the foil, and hence to adhesion of the dry powder mixture to the foil. This requires the dry powder mixture to be disposed on the upper side of the foil, i.e., on the side facing the direction of gravity, so that the resting of the dry powder mixture on the foil under the action of gravity is the only physical interaction between the dry powder mixture and the foil. Since the dry powder mixture is still fully free-flowing after the step of scattering, the plane of the foil has the to be disposed essentially horizontally, i.e. perpendicular to the direction of gravity. The term "essentially" means a deviation of at most 20°, preferably at most 10°, more preferably at most 5°. In a particularly preferred embodiment, the particles rest on foil exclusively by the action of gravity and, in addition, the particles are at least partly present as separate particles, as described above. Since the particles on the foil are free-flowing and smaller in this embodiment, the smaller particles can more easily fill the interstices of the larger particles such that a more compact structure can be obtained.

In a preferred embodiment, scattering the dry powder mixture onto the foil in step (b) is the only process step for distributing the powder on the foil until melting in step (c). This means that further measures for distributing the powder, for example with a squeegee, are excluded.

Step (c)

The melting of the powder can take place, for example, thermally or under IR irradiation. In this process, the meltable polymer, which is preferably a thermoplastic polymer, is at least partially melted. Thus, the melting in step (c) is at least partial melting. Partial melting means that either only part of the polymers are melted or the polymers are not completely melted but only softened. Thus, as used herein, melting means heating to at least the glass transition temperature Tg, and a melted polymer means a polymer that has been heated to at least its glass transition temperature Tg. For example, melting may be heating to a temperature between the softening point and the melting point of the polymer. However, the meltable polymer may also be heated above its melting point and thus completely melted.

Since the powder contains an at least partially molten polymer, the foil obtained in step (c) and covered with molten powder consequently has a powder covering that is at least partially molten.

Melting of the powder results in at least partial dissolution of the particles, especially the particles of the meltable polymer, in the dry powder mixture. Thus, the surface is smoothed and fills spaces between the particles, making the powder layer on the foil more compact. In addition, this causes the powder layer to adhere to the foil.

Step (d)

The firm bonding of the molten powder obtained in step (c) to the foil is carried out in a calender, which has counter-rotating rolls with substantially parallel axes of rotation. The contact pressure of the rolls is adjustable, in particular by the fact that the distance between the axes of rotation of the two rolls is adjustable and/or the speed of rotation of the rolls is adjustable. The rollers can be heatable to effect thermal fixation of the functional coating on the foil and thus increase adhesion.

Step (e)

Cooling is most easily accomplished by allowing the calendered structure to cool at ambient temperature. Alternatively, cooling can also be carried out with the aid of a suitable cooling device. In cold calendering, cooling is already carried out at least in part in step (d).

Regarding steps (c), (d) and (e), the following two variants are possible.

In Variant 1, step (c) is carried out before step (d), e.g. by cold calendering. For example, at least partial melting of the binder and thus pre-contacting of the foil with the powder layer takes place in step (c) by means of high temperatures or other types of energy input (e.g. IR irradiation). The cooling in step (e) can take place at least partially during the cold calendering in step (d), so that steps (d) and (e) are carried out at least partially simultaneously. Variant 1 may be preferred over Variant 2 because melting prior to the calendering step may be faster than by hot calendering.

In Variant 2, steps (c) and (d) are carried out simultaneously by hot calendering. Hence, the contacting of the applied powder mixture is carried out by hot calendering. Variant 2 differs from Variant 1 essentially in that the melting of the powder mixture applied to the foil is carried out by hot calendering and not by two successive process steps. To enable melting, the temperature of the calender rolls must be adjusted accordingly. By saving one process step, Variant 2 may be preferred. By adjusting the temperature and the compaction pressure, the properties of the coating can be controlled during hot calendering.

However, Variant 1 and Variant 2 are not mutually exclusive. In one embodiment, melting step (c) can be carried out before step (d), and step (d) can be carried out as hot calendering. In this case, for example, only partial melting or softening of the polymer may take place in step (c), so that the molten layer on the foil does not become too liquid. This combination allows the advantages of both variants to be combined, namely the advantage of the higher process speed due to prior melting and the advantage of simultaneous melting under pressure during hot calendering.

What is claimed is:

1. A process of producing a foil with a functional coating containing an active material and a meltable polymer, wherein the foil having a functional coating is for use as an electrode foil, an electrolyte in solid-state batteries, or a separator for electrochemical storage, the process comprising the steps of:
   (a) providing a dry powder mixture comprising (i) particles of an active material and (ii) particles of a meltable polymer,
   (b) scattering the dry powder mixture on a foil to form a powder-covered foil,
   (c) melting the powder of the powder-covered foil to form a foil covered with molten powder,
   (d) calendering the foil covered with molten powder to form a calendered structure; and
   (e) cooling the calendered structure to form the foil with a functional coating,
   wherein step (b) is carried out by applying the dry powder mixture to a scattering roller, scraping the dry powder mixture off the scattering roller by means of an oscillating brush, and dropping the dry powder mixture onto the foil through at least one oscillating distribution disc.

2. The process according to claim 1, wherein step (c) is carried out before step (d).

3. The process according to claim 1, wherein steps (c) and (d) are carried out simultaneously by hot calendering.

4. The process according to claim 1, wherein the volume average particle size $D_{50}$ of the particles (i) is more than 5.0 µm, and the volume average particle size $D_{50}$ of the particles (ii) is 5.0 µm or less in the dry powder mixture.

5. The process according to claim 1, wherein steps (b) to (e) are carried out continuously.

6. The process according to claim 1, wherein the dry powder mixture further comprises conductivity additive particles.

7. The process according to claim 1, wherein the dry powder mixture does not adhere to the foil after being scattered onto the foil in step (b) and before melting in step (c) and rests on the foil only by the action of gravity.

8. The process according to claim 1, wherein scattering the dry powder mixture on the foil in step (b) is the only process step for distributing the powder on the foil until melting in step (c).

9. The process according to claim 1, which is a process for producing a metal foil with a functional coating for use as an electrode foil.

10. The process according to claim 1, wherein the active material is at least one material selected from the group consisting of metal oxides, activated carbon, graphite, metal phosphates, and silicon compounds, and/or the meltable polymer is at least one polymer selected from the group consisting of polyvinylidene fluoride, polytetrafluoroethylene, and polysiloxanes.

11. The process according to claim 1, wherein steps (b) to (e) are carried out continuously, and step (c) is carried out before step (d).

12. The process according to claim 1, wherein steps (b) to (e) are carried out continuously, the scattering of the dry powder mixture on the foil in step (b) is the only process step for distributing the powder on the foil until melting in step (c), and steps (c) and (d) are carried out simultaneously by hot calendering.

* * * * *